Jan. 11, 1966 A. L. COURTNEY 3,228,549
PRESSURE VESSEL
Filed Feb. 27, 1961 7 Sheets-Sheet 1

INVENTOR.
ALBERT L. COURTNEY.
BY
*John A. Young*
ATTORNEY.

FIG_2

FIG_3

Jan. 11, 1966 A. L. COURTNEY 3,228,549
PRESSURE VESSEL
Filed Feb. 27, 1961 7 Sheets-Sheet 5

INVENTOR.
ALBERT L. COURTNEY.
BY
John A. Young
ATTORNEY.

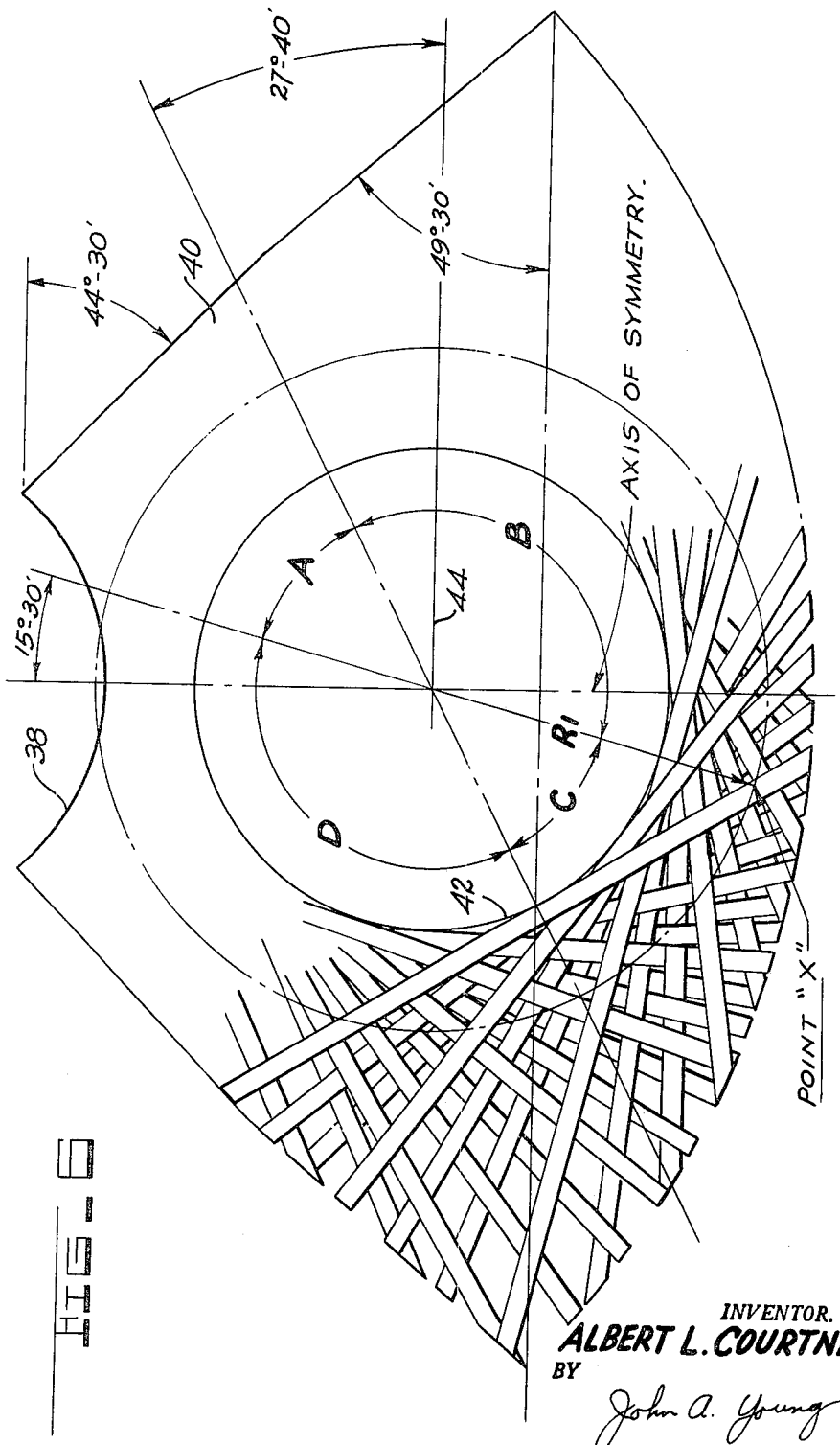

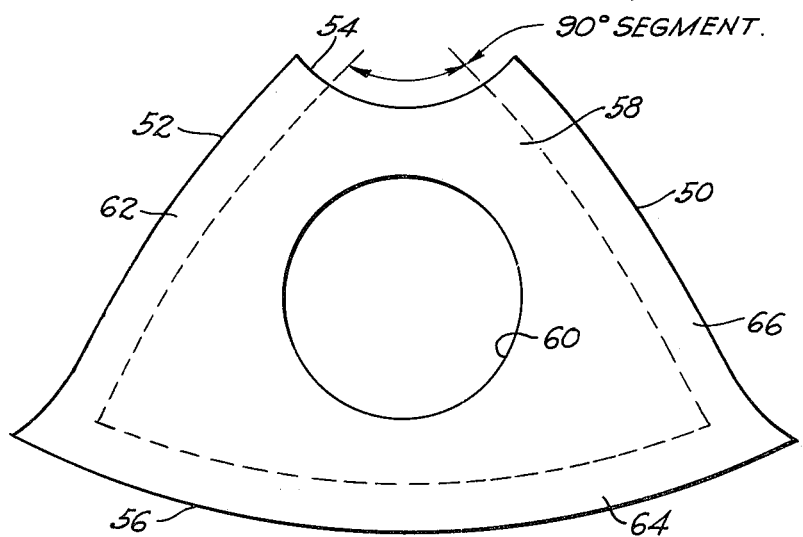
FIG_7
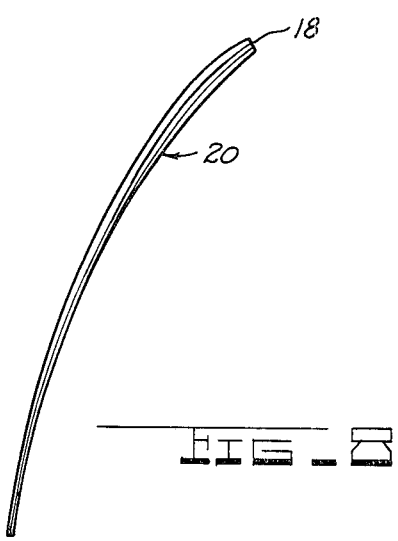
FIG_8
INVENTOR.
ALBERT L. COURTNEY.
BY
ATTORNEY.

United States Patent Office 3,228,549
Patented Jan. 11, 1966

3,228,549
PRESSURE VESSEL
Albert L. Courtney, South Bend, Ind., assignor to The Bendix Corporation, South Bend, Ind., a corporation of Delaware
Filed Feb. 27, 1961, Ser. No. 91,869
12 Claims. (Cl. 220—3)

This invention relates to a pressure vessel and more particularly to a reinforcement structure for surrounding and strengthening areas of said pressure vessel having an aperture or apertures therein.

Certain pressure vessels such as rocket casings and the like must be capable of sustaining substantial internal pressure and at the same time must be equipped with openings of various sizes, shapes and locations to provide for thrust nozzles and other accessories which control the flight of the rocket. A major problem of the rocket casing art has been to devise appropriate means for preventing failure of the rocket casing in the vicinity of openings therein because the casing is weakened when the apertures are formed because the cut ends of the strands or filaments are unable to carry tensile force through their length. The problem is compounded by the fact that stress concentrations occur in the vicinity of the opening overstressing the already weakened casing in the regions adjacent to these openings to produce failure. It has been my experienced, that when a pressure vessel casing is apertured, the resultant weakening of the structure causes a failure of the casing at pressures substantially lower than those for which the casing was designed and therefore the capacity of the casing is reduced. Since the maximum strength capacity of the casing is determined by its weakest portion, it is of little benefit to design a casing for withstanding substantial pressures in one area if failure occurs at another area.

It is therefore an object of the present invention to provide reinforcement members which can be combined with a casing construction to strengthen the casing at those points where the casing is apertured with the result that the capacity of the casing is substantially increased.

Another object of the invention is to provide rocket casing reinforced structures of various shapes and having apertures therein, said reinforcements being for use on developed or nondeveloped surfaces and in which the reinforcement structure will lie geodesically on the casing structure having the aperture.

Another object of the invention is to provide a plurality of reinforcements where there is a pattern of openings in the casing structure, said reinforcements being arranged to provide mutual reinforcement whereby the stresses which are located in the vicinity of the openings, are faired outwardly to the remaining portions of the casing structure.

It is a further object of the present invention to provide a reinforcement structure having flexible lengths of tape which make it possible to construct multilayer sections of the reinforcement so that the forces can be selectively distributed and to those portions of the casing which are able to sustain additional load so that the reinforcement is adapted to whatever shape casing is involved and to whatever size and location or combination of apertures are formed in the casing.

Other objects and features of the invention will become clear from a consideration of the following description which proceeds with the accompanying drawings wherein:

FIGURE 1 is an isometric view of a pressure vessel having the present invention incorporated therein, and having a laminated casing construction which is suitable for rocket motors and the like;

Figure 5:
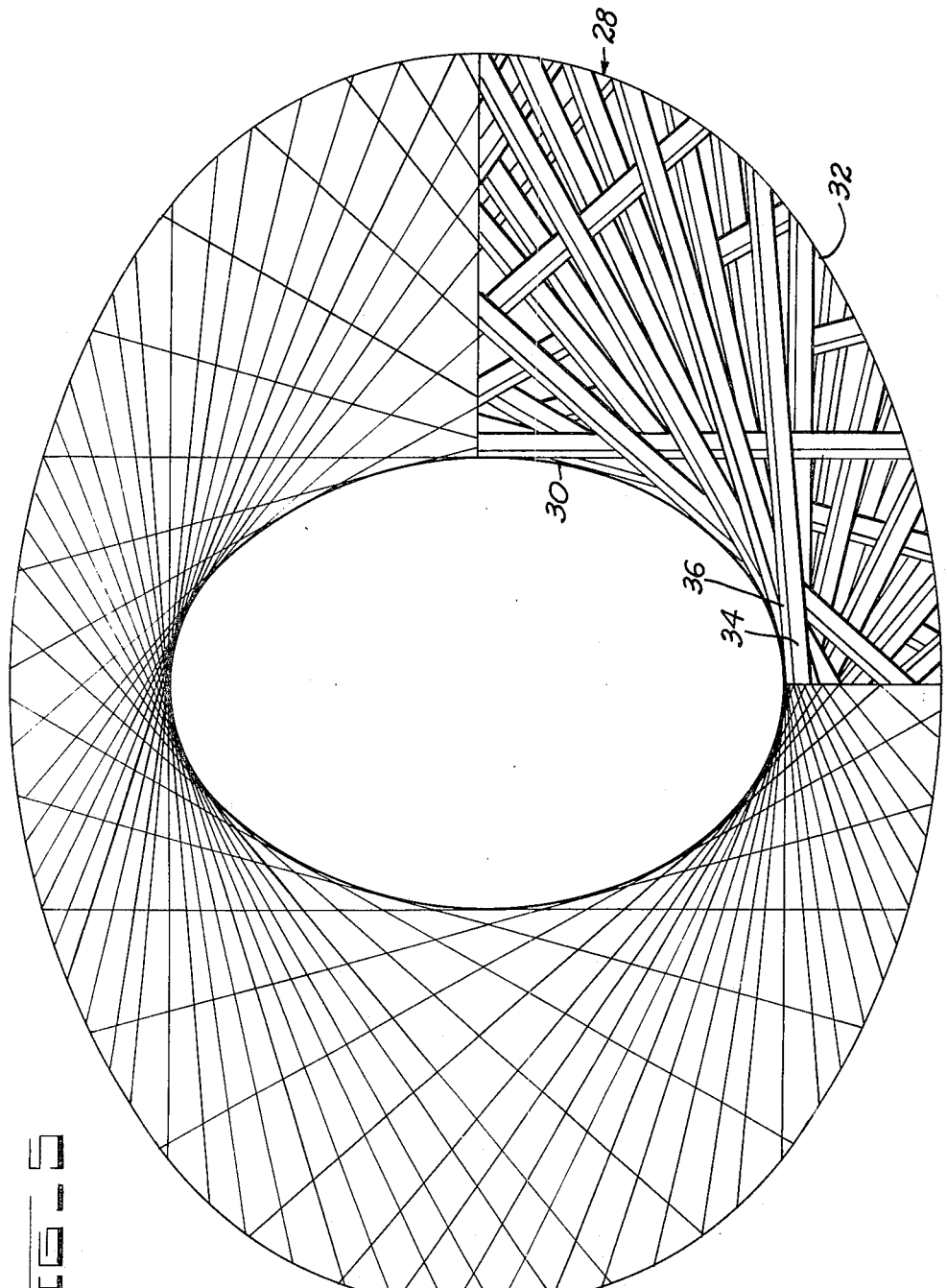

FIGURE 5 illustrates an elliptical-shaped reinforcement having an elliptical center opening, one-quarter of the reinforcement having tapes thereon which are spaced at different intervals in accordance with stress concentration, the tapes being of different widths to provide an additional parameter by which the reinforcement can be constructed to provide the greatest strength at locations of greatest stress concentration;

FIGURE 6 illustrates a sector-shaped reinforcement which is usable for rocket motor casings having openings which are offset from the geometrical center of the end dome;

FIGURE 7 illustrates a curved segment reinforcement for a circular opening, the reinforcement being shaped to conform with a nondeveloped surface against which the reinforcement will overlap at two of its edges with adjacent reinforcements to provide mutual interlocking therebetween; and, FIGURE 8 is a section view taken through the opening of a reinforcement member and illustrating how the tape lengths are varied through the thickness of the reinforcement to fair the forces outwardly.

Figure 1:
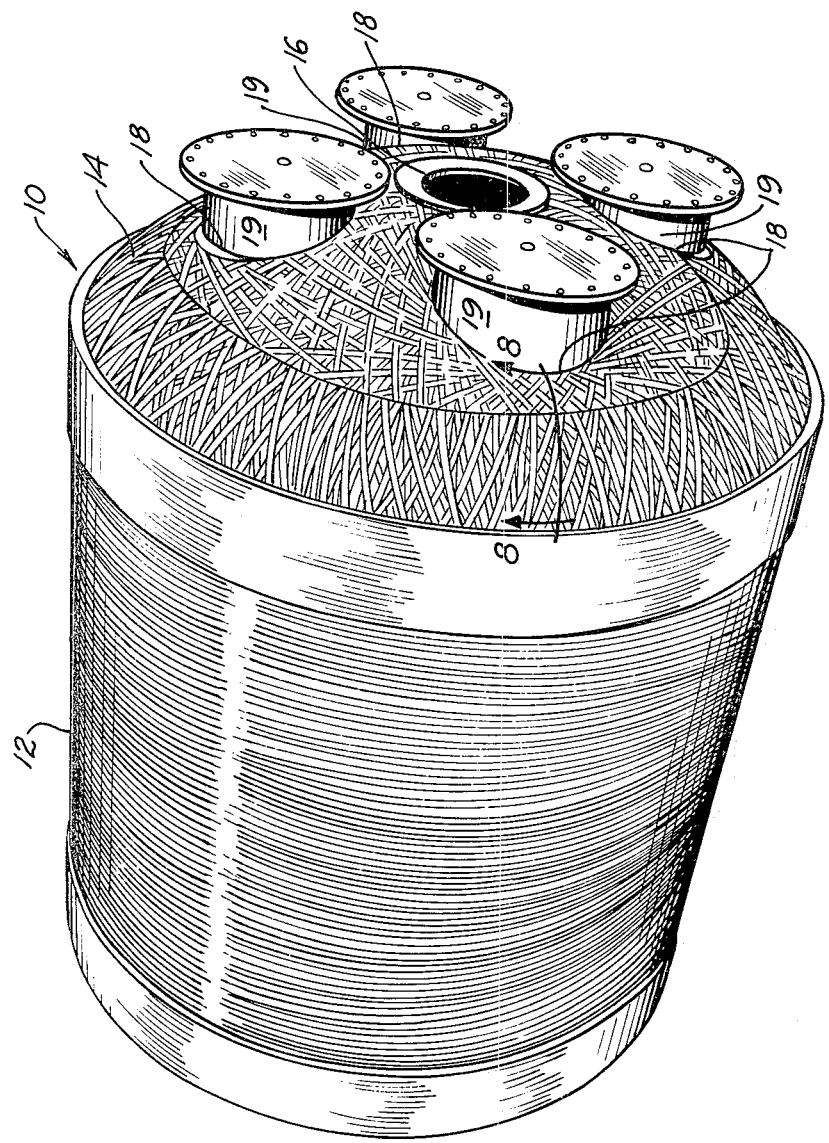

Referring now to the drawings and particularly to FIGURE 1, a rocket casing 10 which is constructed from a continuous length of flexible tape in accordance with the teaching of U.S. application Serial No. 17,909, filed March 28, 1960, includes a cylindrical section 12 and an end dome 14 which in this case is of elliptical cross section. The surface of the end dome 14 is nondeveloped, meaning that it cannot be cut and made to lie flatly and likewise a flat member cannot conform to the end dome structure unless it has a resilience permitting reforming of the member to conform with the surface of the dome. The end dome includes a polar opening 16 and additional nonpolar openings 18 which are fitted with adapters 19 on which are mounted rocket nozzles or the like (not shown) for controlling the flight of the rocket. Those portions of the rocket casing which are apertured to provide for rocket nozzles and the like become weakened and the casing is most likely to rupture in the vicinity of these openings thereby greatly reducing the capacity and reliability of the casing.

In accordance with the present invention, there is constructed a mat or reinforcement which may take numerous different shapes and sizes in accordance with shape, construction, size and location of opening in the casing. Preferably, the mat or reinforcement is fabricated on a form, not shown, conforming to the shape of the casing in the region of the opening therein and then transferred to the casing. However, it will be understood that the tape lengths may be laid out manually, for instance, on the surface of the casing adjacent the opening in the following prescribed pattern thereby eliminating the aforementioned step of transferring the mat or reinforcement from a form to the casing. For example, referring to the polar port opening 16 there is constructed a mat or reinforcement 20 (FIGURE 2) having an opening 16 therein corresponding to the dimensions of the polar port opening 16 and flexible to conform to the shape of end dome 14. Since the forces surrounding the opening 16 are substantially uniform there is provided reinforcement of uniform strength and dimension around its circumference.

Figure 2:
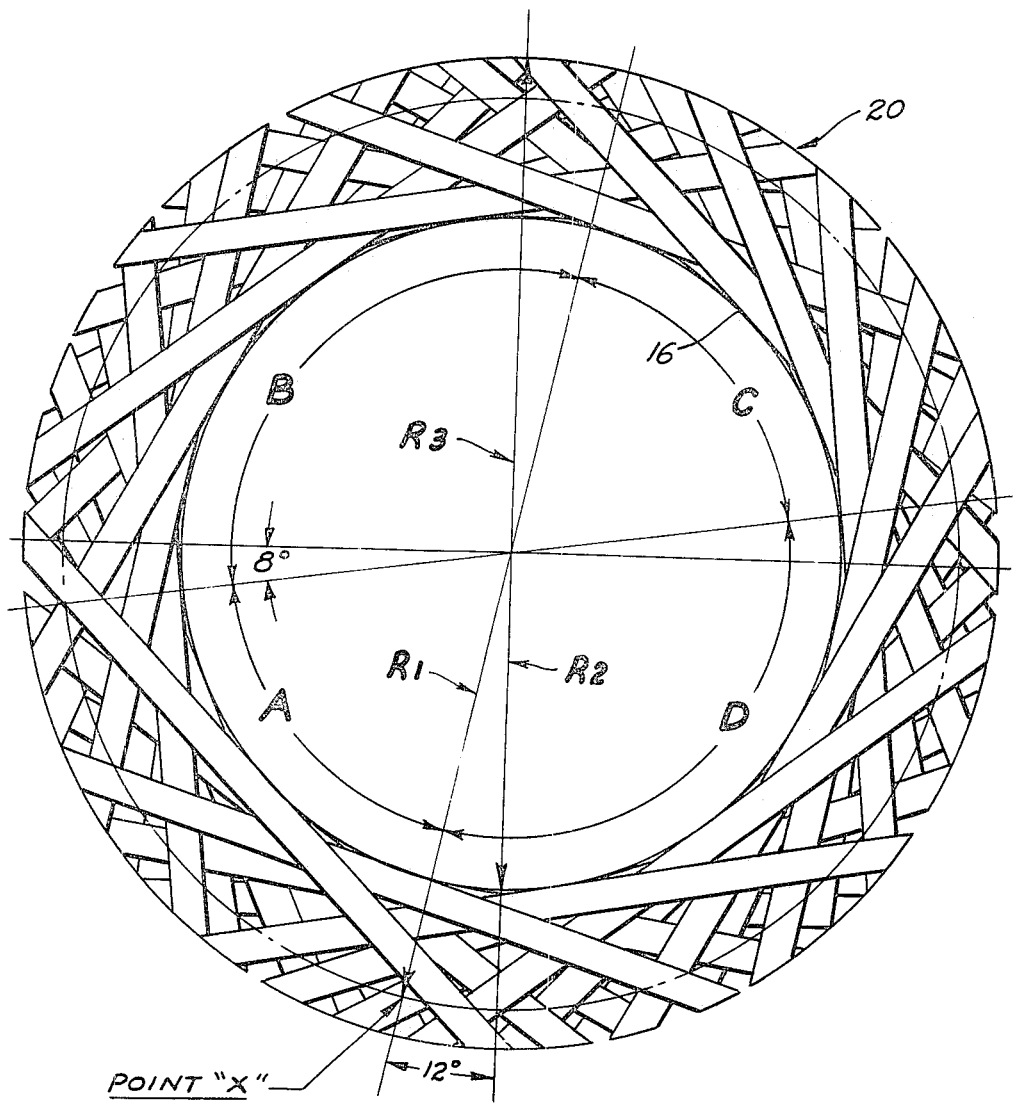
FIGURE 2 illustrates a reinforcement structure for a circular opening in the rocket motor casing.

Referring to FIGURE 2, the reinforcement 20 is constructed with the aid of two radii $R_1$ and $R_2$, radius $R_2$ conforming with the dimension of the opening which it surrounds. Starting from point X, and proceeding around the circumference having radius $R_1$, the sectors "A," "B," "C" and "D," are each divided into twelve equal parts and then, starting at point X tape lengths are laid so that the edge of the first tape lies on point X and is extended so that the inner edge of the tape is tangent with the diameter of circle having radius $R_2$ at its mid length. Successive tapes are started from every third position so that half way along the width of each tape length coincides with the spacing point designated on the circle of radius $R_1$ and extending with the inner edge tangent to the inner circle having radius $R_2$. The tangency point with circle $R_2$ also marks the mid length of the tape. The procedure is repeated until sixteen such tapes are laid following which I move one space clockwise from point X and lay out every third space until sixteen tapes more are laid and then starting two spaces clockwise from point X I repeat the procedure until all of the spaces are filled. The reinforcement is then trimmed to have an outer circumference with radius $R_3$ which is determined by the distance outwardly from the opening to which the stress forces are faired.

Several important features of the tape reinforcement are involved in its function of reinforcing the casing. For example, each of the tape lengths extends from its point of tangency in opposite directions so that a force in the immediate vicinity of the opening is communicated through the length of the tape to portions of the casing which cover the tape length. Because the tapes can be provided in various lengths, it is possible to distribute the forces outwardly to whatever extent is necessary to utilize other portions of the casing and distribute the stress forces from the immediate vicinity of the opening over a greater portion of the casing. The reinforcement structure can be made as strong as required in various manners; by dividing the segments "A," "B," "C" and "D" into smaller subdivisions and varying the arc length of these segments, the density of tape is thereby subject to variation and the tape density can be to proportionately increase the strength of the reinforcement wherever needed.

A further means of obtaining the proper strength of the reinforcement is to build up multilayers of the reinforcement by repeating the tape laying procedure until a double or triple thickness is obtained. For example, referring to FIGURE 8, the reinforcement (shown in cross section) comprises several layers of tape lengths which vary in length to fair the forces through the thickness of the casing as well as radially of the opening. Thus, should the casing structure be made of repeating generations of windings and each distinct layer of reinforcement be inserted after each winding generation of the casing, then the reinforcement distributes the forces to a variable extent both radially of the opening and through the thickness of the casing then the forces are faired to an extent realizing the maximum strength potential of the casing.

A still further means of obtaining suitable strength of the reinforcement is by the use of an appropriate tape material. One tape material which has been found adequate to practice the invention is disclosed in U.S. application Serial No. 825,958, filed July 9, 1959. Briefly, the tape material while not essential in its particulars to the practice of the present invention, must possess suitable tensile strength to distribute the forces outwardly from the immediate vicinity of the opening and, in some instances must be sufficiently flexible to conform with an opposing surface. If the tape material is made originally in a flat planar condition it must be sufficiently flexible to conform with a curved opposed surface. For example, referring to FIGURE 1, the reinforcement must lie against a dome-shape, this being a nondeveloped surface i.e., incapable of being cut and forced to lie in a flat plane. Therefore, if the reinforcement is constructed as superimposed flat lengths of tape, the final product must be sufficiently plastic to conform itself with the dome structure. One tape construction which I found suitable for an eleven-inch diameter port opening a fifteen-inch diameter of $R_1$ is a tape with three-quarters of an inch width having one-hundred and one wires of .006 diameter having a plastic binder in the "B" or semipolymerized condition. Thus, the reinforcement and the casing are generated to have the binder carrying the filaments in a semipolymerized condition, and as in the application 17,909, the assembly is cured to polymerize the binder into a long atom chain having a continuous matrix necessary to bind the casing and reinforcement into a homogenous structure. These dimensions and specific references to tape construction are in no way limitative of the present invention and are provided here only as an example of one typical tape material.

In the event that the stress forces are nonuniformly distributed around the polar port opening 16 then additional tapes can be laid in those areas to resist the greater stress. For example, sectors "A" and "B" are less than sectors "C" and "D" yet each of the sectors receives the same number of tapes with the result that the concentration of tape lengths in sectors "A" and "C" is greater than that for "B" and "D" to resist greater loads in those areas.

In the vicinity of the outer circumference of the reinforcement, the concentration of tape reduces so that at the outer periphery there is a slight spacing between the ends of the tapes. Because the stress forces surrounding the opening are greatest in the immediate vicinity of the opening 16 the reinforcement has its maximum thickness immediately adjacent the opening 16 and diminishes in cross section with the result being that the forces are faired radially outwardly to the casing proper. The reinforcement 20 is connected to the casing structure during the winding process so that the tapes forming the end dome are laid over the reinforcement. The tapes generating the casing, and which cover opening 18 are then cut out and the strength of the cut ends of the tape forming the casing "B," being thereby lost, is supplanted by the reinforcement 20.

Generally, in forming the casing the polar openings are provided by winding the tapes such that each is tangent to the polar opening and no cutting is required to obtain the proper dimensions of the polar opening. Nevertheless, a reinforcement is generally provided surrounding the polar opening because there is nonuniform stressing in the region surrounding said opening unless the end dome is wound both geodesically and is of an ideal profile. Cutting of the casing is performed for nonpolar openings so that the dimension of the opening corresponds with that defined by the opening in the reinforcement.

Figure 3:
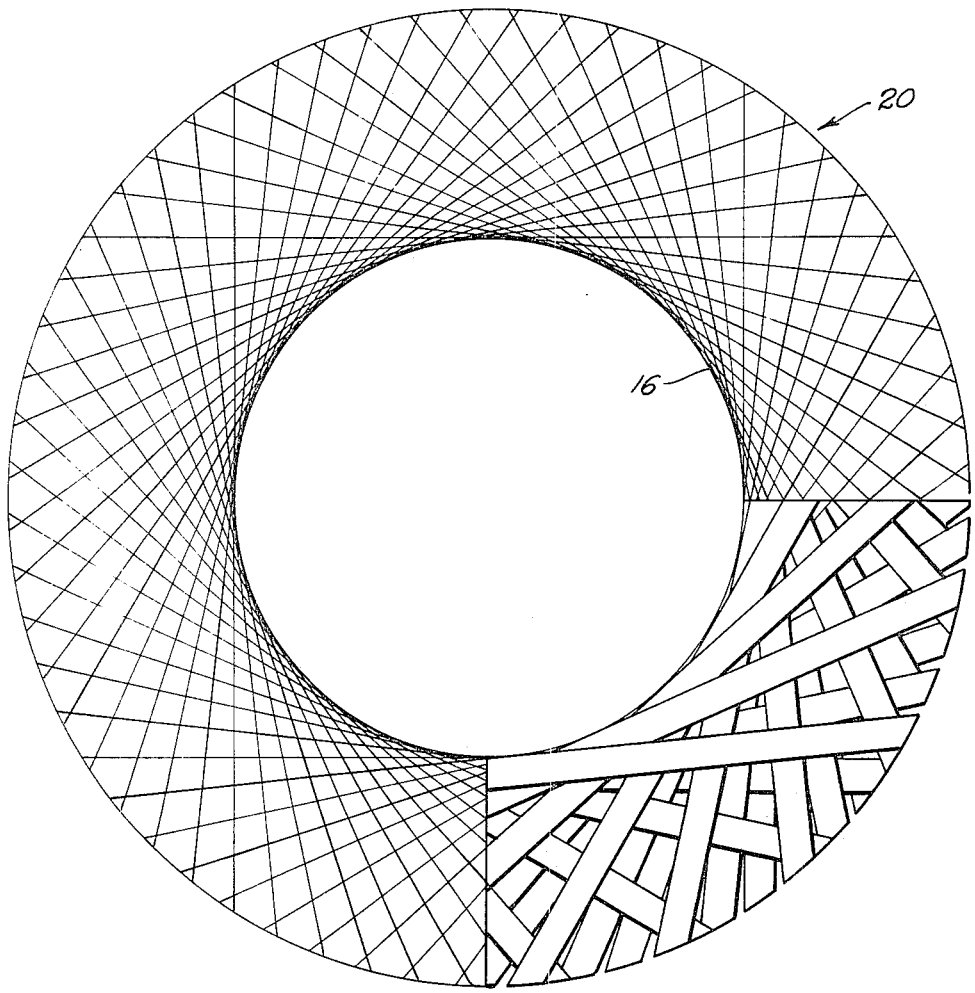
FIGURE 3 is a detail view of a reinforcement which is used for a circular-shaped opening, one-quarter of the reinforcement being shown covered with tape strips and the remaining three-quarters of the reinforcement being lined to indicate the path with which the remaining tape lengths are laid to complete the reinforcement.

Referring next to FIGURE 3, the stresses around the circumference of the reinforcement are uniform so that the distribution of tapes is at regular intervals around the circumference. In other words, comparing the construction to that of FIGURE 2, each of the sectors "A," "B," "C" and "D" are equal and are each 90°.

Figure 4:
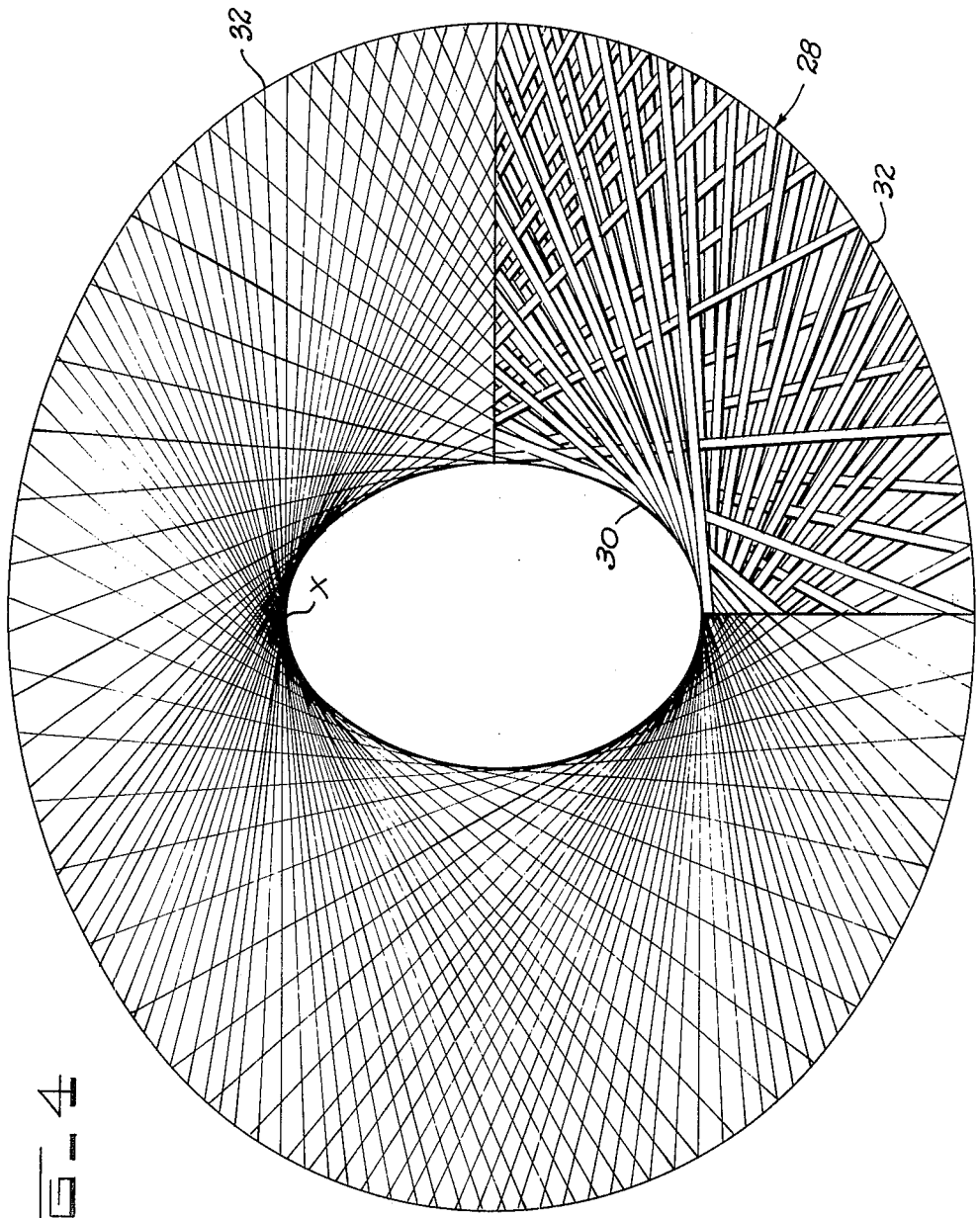
FIGURE 4 illustrates a reinforcement for an elliptical-shaped opening, one quarter of the casing having the tapes provided thereon and the remaining portion illustrating the path which will be taken by the remaining tape lengths.

Referring next to the embodiments illustrated in FIGURES 4 and 7, there are illustrated two different constructions which bring out the adaptability of the invention for different shape and size openings. Referring first to the embodiment of FIGURE 4, the reinforcement 28 has an inner opening 30 which corresponds to the opening in the casing construction and an outer periphery 32 which determines those portions of the casing to which the stress forces are distributed from the immediate vicinity of the opening 30. Once the shape and location of the opening in the casing is determined, the remainder of the casing is evaluated as to which portion is best adapted to receive stress loads and the reinforcement is shaped accordingly to distribute the loads thereto. Thus, having the dimensions of opening 30, and having established the bounds of the outer periphery 32, and knowing the relative density of force around the periphery of opening 30, I start at point X and proceeding in a clockwise direction lay out lines tangent to the elliptical opening 30 until a total of 52 tape lengths are laid tangent to the ellipse and terminate at the outer periphery 32. The spacing of the tape varies and is closest i.e., has greatest density at the ends of the major axis of the elliptical opening and has least density at the points tangent to the minor axis of the elliptical opening, ranging from about 2.5° spacing at the densest point of about 8° at the least dense point. After the lines are so set out, tapes are then laid to correspond with the lines starting at point X and filling every third angular position until point X is reached again. Proceeding clockwise around the elliptical opening 30, I skip one space from point X and repeat the procedure around the periphery of the elliptical opening and then skip two spaces from the point X and again repeat the procedure until all of the spaces are filled. In this manner, tape lengths are interlocked until eventually there is a tape length for each line. The embodiment in FIGURE 4 illusrtates therefore how it is possible to provide for different size openings, different concentration of forces around said opening and the means by which the reinforcement can distribute the load to those portions of the casing best capable of sustaining said load.

Comparing the embodiment of FIGURE 4 with that of FIGURE 5 there is illustrated a combination of two different width tapes 34 and 36, the width of tape 36 being appreciably narrower than that of tape 34 so that the tensile strength of the reinforcement can be increased but without adding unnecessarily to the weight or cross sectional thickness of the reinforcement.

Referring next to the embodiments shown in FIGURES 6 and 7, there are illustrated reinforcement structures for openings located off-center from the center point of the dome. Once the reinforcement is located at any position other than the center point of the dome, there is immediately produced a nonuniform stressing of the tape lengths because of the geometry involved in a non-developed surface. This can be compensated for to some extent by changing the dimensions of the reinforcement. For example, referring to FIGURE 6, the side 38 of reinforcement 40 is concave so that the tape lengths will be more uniformly stressed and the concave shape also permits the reinforcement to extend congruently with the periphery of the polar opening 16 (FIGURE 1).

Another factor which determines the distribution of tapes around opening 42 (FIGURE 6) is the nonuniformity of stress in those areas of the opening which are transverse to line 44 which is perpendicular to the symmetrical axis of the reinforcement intersecting the polar axis. This is because the forces, in flowing around the opening 42, tend to concentrate around the periphery of the opening 42 at a location transversely to line 44. I provide for additional tapes where the stress becomes more concentrated as described next. I divide a circle of radius $R_1$ into sectors "A" and "C" and subdivide these sectors into nine equal spaces; sectors "B" and "D" are each then subdivided into eighteen spaces thereby forming a total of fifty-four spaces. Starting then at point X, I provide a tape at each third space until eighteen tapes are laid and then moving one space clockwise from point X I repeat the procedure of laying a tape length in every third space until more eighteen spaces are laid and then proceed two spaces clockwise from point X providing a tape at every third space until all of the spaces are filled. The resulting structure is cut to the outer periphery desired or achieved in the selection of lengths of the tape. The resulting reinforcement is sufficiently flexible to lie flatly against the end dome of the rocket and is interlocked with the tapes forming the end dome by having the reinforcement in place at the time the tapes forming the casing are laid over the mandrel of the end dome. A cutting operation is then performed on the end dome casing tapes leaving an opening in the casing of the dimension of opening 42 provided by the reinforcement 40. The reinforcement structure 40 shown in FIGURE 6 and the angular dimensions indicated thereon, are suitable for some particular rocket applications where the shape of the end dome and the construction of the tape permits the originally flat reinforcement to reform itself and conform with the surface of the end dome. However, the end domes of other pressure vessels can be so irregular that the reinforcement is not sufficiently resilient to shape itself into a conformable fit, therefore it is advisable to construct the reinforcement on a shaped mandrel corresponding to the end dome portion on which it will be mounted. An illustration of that is indicated in FIGURE 7 where curvature of the sides 50 and 52 together with a shaping from concave side 54 to convex side 56 will permit a preshaped reinforcement 58 to lie against the end dome. As in the previous embodiments, the opening 60 will be disposed at whatever location is intended to form an opening in the casing structure so that when the casing opening is cut, the opening will be defined by opening 60 in the reinforcement and the strength which is lost from cutting the casing proper is supplanted by the reinforcement 58. A margin 62, 64 and 66 bounds three sides of the reinforcement and the reinforcement is dimensioned so that adjacent reinforcement segments overlap by an amount of these margins 62 and 66 whereby the forces are distributed substantially evenly as indicated in FIGURE 1 from one zone having an opening to the next adjacent zone.

The over-all strength of the end dome is therefore substantially uniform around the entire region of the dome, meaning that the stresses are so uniformly distributed that the casing is not overstressed at any one point.

Much of the success of the present invention is attributed to the fact that stress in the regions of the apertures in the casing are faired out approximately uniformly and the pattern of stress distribution may be made a matter of design. This is achievable by construction techniques which are made available by using the reinforcement material in tape form. Another manner in which I fair these forces out is by varying the thickness of the reinforcement. For example, considering the casing as a whole the casing is constructed from a number of tape windings which can be made in any number of generations or winding cycles and therefore it is possible to locate layers of the reinforcement during the construction of the casing. Thus referring to FIGURE 8, the reinforcement structure can vary in length through its thickness so that the forces are faired along a variable path through the thickness of the casing as well as through a given surface of the casing.

The present invention has substantiated from numerous testings and actual rocket firings that strength losses from providing various openings can be restored to the casing so that the original strength of the casing is substantially achieved, it being understood that whenever any opening is made in a casing construction formed from continuous lengths of tape, there is inevitably some weakening of the casing because of a disruption of the tape which can, at best, only be approximately restored.

The reinforcement structures are usable not only on nondeveloped surfaces but on developed surfaces as well. Thus, the cylindrical portion of the casing is sometimes apertured and suitable reinforcement can be provided at that location as well as the end dome and in most cases, if not all, this will be an even simpler problem because the reinforcement can lie flatly against any developed surface presenting no problems whatever of distortion when constructed from a flat pattern and then laid against the casing with its appropriately sized opening and surrounding structure which becomes interlocked with the cylindrical portion of the casing.

Those skilled in the art can reasonably be expected to make numerous adaptations and revisions of the present invention to suit their individual design requirements but it is intended that such revisions and variations of the invention as incorporate the herein disclosed principles, will be included within the scope of the following claims as equivalents of the invention.

What is claimed is:

1. A reinforcement structure for a discontinuous portion of a filament wound casing construction, said reinforcement structure comprising a plurality of distinct lengths of tapes having points of tangency with the discontinuous portion and extending in opposite directions from said points of tangency to distribute the forces surrounding the discontinuous portion through tensile force developed therein, said opposite extending portions of said tape strips terminating outwardly from the periphery of the discontinuous portion thereby defining a substantially continuous peripheral edge portion of said reinforcement structure, means for interlocking said reinforcement structure with said casing, said tape lengths being disposed in surrounding relation with the discontinuous portion and at various angles to provide the required spacing of tape material which is at a density in accordance with a force distribution about the discontinuous portion.

2. The reinforcement structure in accordance with claim 1 wherein the discontinuous portion is circular and the tape lengths are disposed in tangential relation therewith to surround the circular discontinuous portion.

3. The reinforcement structure in accordance with claim 1 wherein the discontinuous portion is elliptical and the tape lengths are disposed in tangential relation therewith to surround the elliptical discontinuous portion.

4. A pressure vessel having a laminated casing comprising a cylindrical section, a continuous convexly shaped end dome for said cylindrical section, said end dome having an opening on the longitudinal axis of said cylindrical section, and a reinforcement member including strips of tape disposed with one edge thereof tangent to said opening and spaced at angular increments around the periphery of said opening to surround said opening and extend in opposite directions from said tangent points into overlapping engagement with the portion of the end dome surrounding the opening, said overlapping portion of said strips of tape being confined to the end dome portion and secured between adjacent laminations of the casing.

5. A pressure vessel having a laminated casing comprising a cylindrical section, a continuous convexly shaped end dome for said cylindrical section, said end dome having an opening offset from the geometrical center of said dome, a reinforcement member including strips of tape disposed with one edge thereof tangent to said opening and spaced at angular increments around the periphery of said opening to surround said opening and extend in opposite directions from said tangent points, said strips of tape having their mid point located at the point of tangency with said opening and means for securing said reinforcement member to an adjacent lamination of said casing to thereby effect reinforcement of the lamination by the reinforcement member.

6. A pressure vessel having a laminated casing comprising a cylindrical section, a continuous convexly shaped end dome for said cylindrical section, said end dome having an elliptical opening, and a reinforcement member including strips of tape disposed with one edge thereof tangent to said opening and spaced at angular increments around the periphery of said opening to surround said opening and extend in opposite directions from said tangent points, said oppositely extending portions of said tape terminating inwardly of the peripheral edge of said end dome and said reinforcement member being fixedly secured between adjacent laminations of the casing.

7. In a pressure vessel, a casing including a cylindrical section and a dome-shaped end portion having an opening formed in said dome-shaped end, a reinforcement for said opening comprising a plurity of lengths of tape disposed in tangent relation with said opening and extending in opposite directions from said tangent point to form at the outer periphery of said reinforcement a concave side, a convex side and two rectilinear sides tapering outwardly from said concave to said convex side to fair the casing forces surrounding said opening to portions thereof outwardly from said casing, means for locating said reinforcement with the concave side thereof facing the center of said dome, said reinforcement overlapping the casing surrounding the opening and means securing the casing and said overlapping reinforcement member in fixed engagement.

8. In a rocket motor, a casing including a cylindrical section and a dome-shaped anterior end portion having a plurality of openings formed in said dome-shaped end in spaced relation, a reinforcement for each of said openings each comprising a plurality of lengths of tape disposed in tangent relation with said opening and extending in opposite directions from said tangent point to form at the outer periphery of said reinforcement an arcuate concave side, a convex side and two rectilinear sides tapering outwardly from said concave to said convex side, to fair the casing forces surrounding said opening to portions thereof outwardly from said casing, said reinforcements being laid over said openings and having the rectilinear sides of adjacent reinforcements in overlapped relation, and means for fixedly securing said reinforcement and said casing together with the concave side of said reinforcement facing the center of said dome.

9. The reinforcement structure in accordance with claim 8 wherein said opening is a circular opening.

10. The reinforcement structure in accordance with claim 8 wherein said tape lengths forming said reinforcement are flexible to effect conformity of said reinforcement to the nondeveloped surface of said end dome.

11. A reinforcement structure for a pressure vessel casing having an opening through the wall thereof, said reinforcement structure comprising:

a plurality of strips of flexible tape each of which is disposed with one edge thereof at tangency with the circumferential portion of the wall opening and extending in opposite directions from said tangency point into overlapping engagement with the casing wall surrounding the wall opening to communicate tensile forces from the vicinity of the wall opening to the surrounding wall portion, said tape strips being angularly disposed relative to one another to form a continuous pattern surrounding the wall opening thereby substantially duplicating the circumference of the wall opening to effectively fair stress forces substantially uniformly outwardly from the wall opening to the surrounding wall portion, said opposite extending portions of said strips of tape terminating radially outwardly from the wall opening to define a substantially continuous outer peripheral edge portion of said reinforcement structure and, said plurality of strips of tape being secured to the casing wall to reinforce the same.

12. A reinforcement structure for a laminated pressure vessel casing having an opening through the laminated wall thereof, said reinforcement structure comprising:

a plurality of strips of flexible tape each of which is disposed with one edge thereof tangent to the circumference of the wall opening and extending in opposite directions from said tangency point into overlapping engagement with the casing wall surrounding the wall opening to fair concentrations of stress outwardly from the wall opening to the casing wall, said tape strips being successively angularly disposed to form a continuous pattern surrounding the wall opening thereby substantially duplicating the circumference of the wall opening, said opposite end portions of said strips of tape terminating radially outwardly from the wall opening to define a substantially continuous outer peripheral edge portion of said reinforcement structure, said plurality of tape strips being secured between adjacent laminations of the casing wall.

References Cited by the Examiner

UNITED STATES PATENTS

| | | | |
|---|---|---|---|
| 216,550 | 6/1879 | Biersach | 220—71 |
| 2,479,828 | 8/1949 | Geckler. | |
| 2,744,043 | 5/1956 | Ramberg. | |
| 2,901,190 | 8/1959 | Wentz. | |
| 3,005,256 | 10/1961 | Young. | |
| 3,047,191 | 7/1962 | Young | 220—83 |
| 3,074,585 | 1/1963 | Koontz | 220—83 |

FOREIGN PATENTS 1,068,933  2/1954  France.

THERON E. CONDON, *Primary Examiner.*

EARLE J. DRUMMOND, *Examiner.*